Patented Sept. 28, 1948

2,450,272

UNITED STATES PATENT OFFICE 2,450,272

PLASTICIZABLE ORGANIC COMPOUNDS PLASTICIZED WITH AN ALKOXYALKYL ETHER OF A HALONITROPHENOL

George L. Doelling, St. Louis, and Kenneth H. Adams, Fenton, Mo., assignors to Mississippi Valley Research Laboratories, Inc., St. Louis, Mo., a corporation of Missouri No Drawing. Application March 23, 1946, Serial No. 656,785

5 Claims. (Cl. 106—188)

Among the objects of this invention is to plasticize plasticizable organic substances with alkoxyalkyl ethers of halonitrophenols. Other objects will be in part apparent and in part pointed out hereinafter.

According to the present invention plasticizable organic substances plasticized with alkoxyalkyl ethers of halonitrophenols are provided, or more particularly the halonitrophenyl ethers of aliphatic glycol monoalkyl ethers. The ethers of the present invention have the following general structural formula:

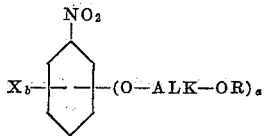

in which ALK represents a divalent aliphatic hydrocarbon radical containing not more than six carbon atoms, R represents an aliphatic hydrocarbon radical containing not more than ten carbon atoms, X represents a halogen such as chlorine, fluorine and bromine, $a$ represents one or two and $b$ represents a small whole number, the sum of $a$ plus $b$ being less than six. The halogen or (O—ALK—OR) substituents may be substituted for the hydrogen in any position of the benzene nucleus not otherwise occupied. The ALK radical is preferably a lower alkylene such as ethylene, propylene or butylene.

In view of the above, it will be seen that the several objects of the invention are achieved and other advantageous results attained.

The ethers represented by the foregoing formula include alkoxyalkyl ethers of halonitrophenols which also have one or more lower alkyl groups such as methyl, ethyl, or isopropyl substituted for hydrogen in the benzene ring. The nitro compounds of the present invention may be reduced if desired to amino compounds and amides and other derivatives may be made from them.

Among the ethers of the present invention are the mono-, di- or trichloronitrophenyl ether of ethylene glycol monoethyl ether, the bromonitrophenyl ether of ethylene glycol monoethyl ether, the chloronitrophenyl ether of propylene glycol monomethyl ether, the chloronitrophenyl ether of ethylene glycol monoisopropyl ether, the chloronitrophenyl ether of ethylene glycol monobutyl ether, and the chloronitrophenyl ether of ethylene glycol monomethyl ether.

The ethers of the present invention are valuable high boiling solvents and plasticizers for plastic and polymeric materials.

The following examples illustrate the invention:

Example 1

The beta-ethoxyethyl ether of 4-chloro-2-nitrophenyl having the formula:

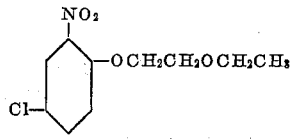

was made from 2,5-dichloronitrobenzene and the monoethyl ether of ethylene glycol.

| | Weight | Mols |
|---|---|---|
| | Grams | |
| 2,5-dichloronitrobenzene | 128 | .67 |
| Ethylene glycol monoethyl ether | 225 | 2.50 |
| Potassium hydroxide (90% flakes) | 49.9 | .80 |

The 2,5-dichloronitrobenzene and the ethylene glycol monoethyl ether were charged into a 500 milliliter 3 neck round bottom flask equipped with a reflux condenser, a mechanical stirrer and an inlet tube for oxygen. The materials were heated to about 50° C. and then a slow stream of oxygen gas was bubbled continuously through the batch during the entire run to prevent reduction of the nitro groups. When the temperature reached 57° C. 5 grams of potassium hydroxide were added. The batch was stirred continuously and the temperature held at 57° C. to 60° C. The remainder of the alkali was added in small portions of 5 grams to 7 grams each during the reaction. The rate of addition of the alkali was at about the same rate as it was used up in the reaction, as determined by removing samples at intervals and titrating the free alkali present. A one-milliliter sample of the batch titrated from about 1 milliliter to 4.5 milliliters of 0.1N HCl to phenolphthalein at various times during the run. Time of reaction was about 6 hours.

The batch was worked up by diluting with water, extracting two or three times with benzene, then washing the benzene extract with a 3% sodium hydroxide solution and then with water till neutral. After removal of solvent the product was distilled in vacuum. The product was 142.5 grams of an amber-colored oil which distilled at 136° C. to 138° C. at about 2 millimeters. The molecular weight of this product was determined by the camphor method and was found to agree with the theoretical value for the beta-ethoxyethyl ether of 4-chloro-2-nitrophenol.

This product is useful as a cellulose nitrate plasticizer. Ten grams of cellulose nitrate and 10 grams of beta-ethoxyethyl ether of 4-chloro-2-nitrophenol were dissolved in 100 milliliters of a mixture of equal parts of absolute ethyl alcohol and n-butyl acetate. This solution was then floated onto a glass slide and the solvent allowed to evaporate. A clear flexible film resulted which remained clear. Also a solution with only half as much plasticizer (50% on the weight of cellulose nitrate) gave a flexible, clear film. This product is highly compatible with cellulose nitrate. This ether is also compatible with cellulose acetate up to 50% or more of the weight of the cellulose acetate.

*Example 2*

The beta-ethoxyethyl ether of 2-chloro-4-nitrophenol having the formula:

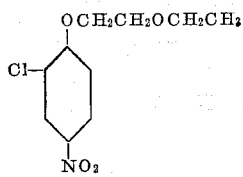

was made from 3,4-dichloronitrobenzene and the mono-ethyl ether of ethylene glycol. The procedure was practically the same as in Example 1. About 90% of theory yield of a pale yellow oil was secured. This product had approximately the correct molecular weight for the beta-ethoxyethyl ether of 2-chloro-4-nitrophenol and the boiling point was 170° C. to 172° C. at about 2 millimeters. The ether from this run was tested with cellulose nitrate and gave a clear film in both 50% and 100% ratio (weight for weight on cellulose nitrate). This product was also tested with cellulose acetate. A solution in 50% ratio was made up as follows:

| | |
|---|---|
| Cellulose acetate | grams 10 |
| Beta-ethoxyethyl ether of 2-chloro-4-nitrophenol | grams 5 |
| Methyl cellosolve | millimeters 40 |
| Acetone | do 40 |

This solution, when floated on a glass slide and the solvent evaporated, gave a clear film, showing that this product is compatible in the ratio of at least 50% of the weight of cellulose acetate.

This beta-ethoxyethyl ether of 2-chloro-4-nitrophenol was also tested for compatibility with polyvinyl butyral, cellulose acetate-butyrate, ethyl cellulose and vinyl chloride-vinylidene chloride copolymer.

This ether used in the amount of 20% of the weight of polyvinyl butyral (Vinylite XYNC) gave a clear film. This ether used in the amount of 30% of the weight of vinyl chloride-vinylidene chloride copolymer gave a relatively flexible composition. When this ether was used in the amount of 20% of the weight of cellulose acetate-butyrate (16% butyryl) it gave a clear film. Also when incorporated with ethyl cellulose in the amount of 25% of the weight of the ethyl cellulose it was entirely compatible with the ethyl cellulose in this ratio.

*Example 3*

The beta-methoxyethyl ether of 4-chloro-2-nitrophenol was made from 2,5-dichloronitrobenzene and the methyl ether of ethylene glycol in similar to Example 1.

The product distilled at 130° C. to 135° C. at about 2 millimeters and after recrystallization had a melting point of 54° C. to 55° C.

*Example 4*

The beta-methoxyisopropyl ether of 2-chloro-4-nitrophenol having the formula:

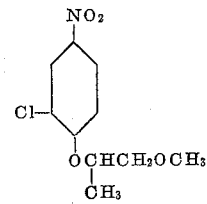

was made from 3,4-dichloronitrobenzene and alpha-propylene glycol monomethyl ether in a similar manner to Example 1. The product was an amber-colored oil boiling at 170° C. to 174° C. at about 2 millimeters. The yield was 145 grams from 128 grams of 3,4-dichloronitrobenzene.

This beta-methoxyisopropyl ether of 2-chloro-4-nitrophenol was tested for compatibility with cellulose nitrate and cellulose acetate. It gave clear, flexible films with cellulose nitrate both in the amount of 50% and 100% on the weight of the cellulose nitrate. It is also compatible with cellulose acetate in the amount of over 50% of the weight of cellulose acetate.

*Example 5*

The beta-n-butoxyethyl ether of 4-chloro-2-nitrophenol having the formula:

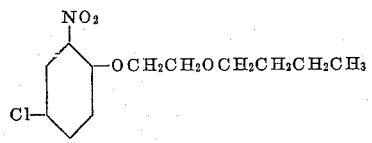

was made in a manner similar to Example 1 from 2,5-dichloronitrobenzene and ethylene glycol mono-n-butyl ether. The product was an amber-colored oil having a boiling point of 143° C. to 146° C. at about 2 millimeters. The molecular weight agreed very closely with the theoretical value for this compound.

*Example 6*

The beta-ethoxyethyl ether of 4-bromo-2-nitrophenol having the formula:

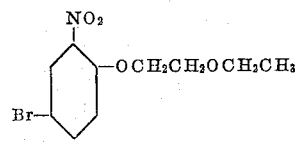

was made from 2,5-dibromonitrobenzene and ethylene glycol monoethyl ether in a similar manner to Example 1. The product was an oil boiling at 150° C. to 155° C. at about 2 millimeters. Its molecular weight checked very closely to the theoretical value for this compound.

*Example 7*

A dichloro-compound of this type was made from 2,4,5-trichloronitrobenzene and ethylene glycol monoisopropyl ether. The product was the beta-isopropoxyethyl ether of 2,5-dichloro-4-nitrophenol, having the following formula:

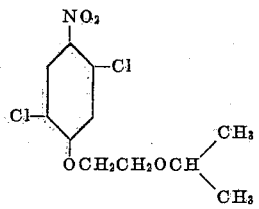

This was a light-yellow oil boiling at 157° C. to 159° C. at about 2 millimeters. Its molecular weight agreed very closely to the theoretical value for this compound.

This reaction was run at 45° C. to 46° C. and the reaction went very rapidly even at this low temperature. There was no evidence of any reduction of the nitro group or other side reaction except for formation of a small amount of the di-ether and a small amount of trichloronitrophenol.

This product was tested for compatibility with cellulose nitrate. A film made using 50% of this product on the weight of cellulose nitrate gave a film that was clear and remained clear after several days in air at room temperature.

*Example 8*

A mono-chloro di-ether was made by condensing 2,4,5-trichloronitrobenzene with 2 mols of ethylene glycol monoethyl ether, to form a compound having the formula:

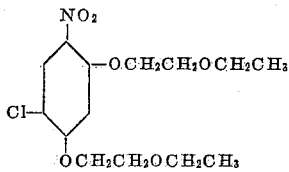

The materials used were as follows:

|  | Weight | Mols |
| --- | --- | --- |
|  | Grams |  |
| 2,4,5-trichloronitrobenzene | 56.6 | .25 |
| Ethylene glycol monoethyl ether | 135 | 1.50 |
| Potassium hydroxide (90% flakes) | 37.7 | .605 |

The trichloronitrobenzene and the glycol-ether were charged into a flask equipped with a stirrer and oxygen gas was bubbled through while heating the batch up to about 40° C. Then 3 grams of the KOH were added and the batch stirred until a test indicated that most of the KOH had been consumed, when another portion of KOH was added. Oxygen was bubbled through during the entire reaction period. The KOH was added in portions and all of it was added in about three hours. The temperature was raised gradually to about 60° C. during this time. It was held at about 64° C. for 3 more hours, then stopped and the product recovered as described in Example 1. The crude product weighed 68 grams.

The 2,4-di-(ethoxy ethoxy)-5-chloronitrobenzene after purification gave crystals having a melting point of 55° C. The molecular weight checked very closely with the theoretical value for this compound.

This di-ether was tested for compatibility with cellulose nitrate. A solution was made containing 10 grams of cellulose nitrate and 5 grams of this di-ether. A small amount of this solution was floated on a glass slide and then the solvent was evaporated. The resulting film was clear and remained clear after several days exposure to the atmosphere.

*Example 9*

The beta-(2-ethylbutoxy)-ethyl ether of 4-chloro-2-nitrophenol having the formula:

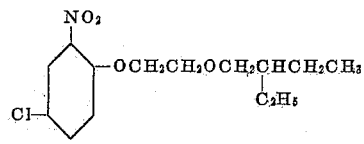

was made from 2,5-dichloronitrobenzene and the mono-2-ethyl-butyl ether of ethylene glycol, in a manner similar to Example 1. The temperature during most of the reaction was from 55° C. to 58° C. and about 4.5 hours were needed to complete the reaction. A good yield of product resulted which had a boiling point of 157° C. to 161° C. at about 2 millimeters.

*Example 10*

The beta-ethoxyisopropyl ether of 2,4,5-trichloro-6-nitrophenol having the formula:

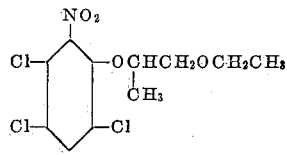

was made from 2,3,5,6-tetrachloronitrobenzene and alpha-propylene glycol monoethyl ether in a manner similar to Example 8. However, the temperature during the reaction was held at from 38° C. to 43° C. and the time of reaction was about 3.5 hours. The product was recovered from the reaction mixture in the usual manner. It was a practically water-white oil boiling at 145° C. to 147° C. at about 2 millimeters, and its molecular weight checked very closely with the theoretical for this compound.

A test for compatibility of this product with cellulose nitrate was made. A solution was made containing 10 grams of cellulose nitrate and 5 grams of beta-ethoxyisopropyl ether of 2,4,5-trichloro-6-nitrophenol. One or two milliliters of this solution were placed on a glass slide. After evaporation of the solvent this left a film that was clear and remained clear after several days in air, showing that this ether is compatible with cellulose nitrate up to at least 50% of the weight of cellulose nitrate.

*Example 11*

The beta-n-butoxyethyl ether of 2-methyl-3-chloro-4-nitrophenol having the formula:

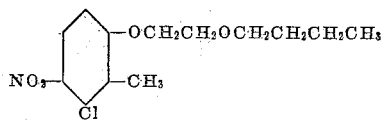

was made from 2,6-dichloro-3-nitrotoluene and ethylene glycol monobutyl ether, in a manner similar to Example 1.

The product was a liquid boiling at 152° C. to 155° C. at about 2 millimeters. The molecular weight was determined and it checked very closely with the theoretical value for this compound.

Example 12

The beta-(2-ethyl)-n-hexoxy ethyl ether of 4-chloro-2-nitrophenol, having the formula:

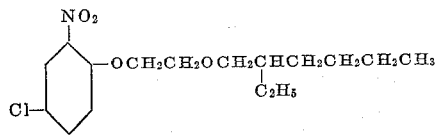

was made from 2,5-dichloronitrobenzene and ethylene glycol mono-2-ethyl-hexyl ether. The product was a light-colored liquid which distilled at 170° C. to 173° C. at about 2 millimeters.

This beta-(2-ethyl)-n-hexoxyethyl ether of 4-chloro-2-nitrophenol was found to be compatible with cellulose nitrate up to at least 50% of the weight of the cellulose nitrate.

In carrying out the foregoing methods, an alkaline substance is employed to effect the condensation. This need not be potassium hydroxide or sodium hydroxide but may be another strongly alkaline substance. The use of oxygen during the process is not essential and a fair yield may be obtained in the preparation of some of the lower members of the present series where oxygen is omitted. However, particularly in the preparation of the high members of the series, the use of oxygen improves the yield and also the quality of the product. The ethers are lighter in color where oxygen is used.

These alkoxyalkyl ethers of halonitrophenols are useful as plasticizers and as components in plastic and high polymeric compositions. They are relatively low in volatility, stable over a wide range of temperatures, and due to the fact that they do not contain any ester groups, they are not subject to hydrolysis. The great majority of plasticizers now in use are esters, and as a result are subject to hydrolysis and saponification.

The compounds of the present invention are practically insoluble in water but are soluble in alcohol, benzene and other common organic solvents, hence can easily be compounded into lacquers, paints and similar compositions. The amount of plasticizer used may vary from about 5% to 70% or more of the weight of material being plasticized, depending upon each individual case.

The method of producing the compounds of our invention, as given in the examples, is effective, in general, only when a halogen to be replaced from the benzene nucleus is in a position either ortho or para to the nitro group. The compounds in which the alkoxyalkyl ether group is meta to the nitro group can be made from the corresponding halonitrophenols by other appropriate methods as, for example, by reacting the appropriate phenol with a halide.

In general, the method given consists of mixing the halonitrobenzene and the proper glycol monoalkyl ether, heating the mixture to a temperature not over about 100° C., passing a current of oxygen or oxygen containing gas through the solution and adding an alkaline material, preferably in a number of portions as the reaction progresses, thus avoiding having a large concentration of alkali in solution at any time during the reaction. An excess of the glycol ether is desirable in order to obtain complete reaction of the halonitrobenzene. For best results the concentration of alkali in the reaction mixture during the reaction should be kept less than 1.0 normal and we prefer to keep it 0.5N or less; that is, one milliliter of the reaction mixture when titrated in an aqueous acetone solution to phenolphthalein indicator, should preferably take not over one milliliter of 0.5N HCl solution to neutralize it. The oxygen or oxygen containing gas is preferably passed into the reaction mixture throughout the reaction, in order to keep an appreciable amount of oxygen in solution at all times. This is to prevent reduction of the nitro group to azoxy or other reduction products.

We claim:

1. A plasticized composition comprising a plasticizable organic substance and as a plasticizer therefor, a compound having the formula:

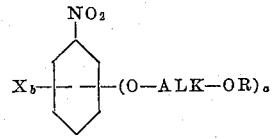

in which ALK represents a divalent aliphatic hydrocarbon radical containing not more than six carbon atoms, R represents an aliphatic hydrocarbon radical containing not more than ten carbon atoms, X represents a halogen, $a$ is not more than two, $b$ is an integer, and the sum of $a$ plus $b$ is less than six.

2. A plasticized composition comprising a plasticizable organic substance and as a plasticizer therefor, an alkoxyalkyl ether of a halonitrophenol in which the alkoxy group contains not more than ten carbon atoms.

3. A composition of matter comprising a compound having the formula:

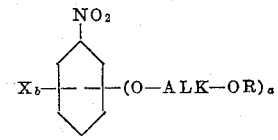

in which ALK represents a divalent aliphatic hydrocarbon radical containing not more than six carbon atoms, R represents an aliphatic hydrocarbon radical containing not more than ten carbon atoms, X represents a halogen, $a$ is not more than two, $b$ is an integer and the sum of $a$ plus $b$ is less than six, and a plasticizable organic substance.

4. A composition of matter comprising a compound having the formula:

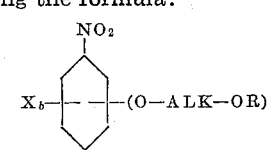

in which ALK represents a divalent aliphatic hydrocarbon radical containing not more than six carbon atoms, R represents an aliphatic hydrocarbon radical containing not more than ten carbon atoms, X represents a halogen, $a$ is not more than two, $b$ is an integer and the sum of $a$ plus $b$ is less than six, and a cellulose derivative selected from the group consisting of cellulose esters and cellulose ethers.

5. A composition of matter comprising a compound having the formula:

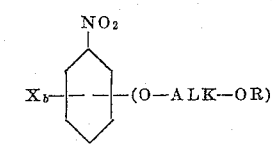

in which ALK represents a divalent aliphatic hydrocarbon radical containing not more than six carbon atoms, R represents an aliphatic hydrocarbon radical containing not more than ten carbon atoms, X represents a halogen, $a$ is not more than two, $b$ is an integer and the sum of $a$ plus $b$ is less than six, and a vinyl resin.

GEORGE L. DOELLING.
KENNETH H. ADAMS.

REFERENCES CITED

The following references are of record in the file of this patent:

UNITED STATES PATENTS

| Number | Name | Date |
|---|---|---|
| 1,479,955 | Carroll | Jan. 8, 1924 |
| 2,056,261 | Dahlen | Oct. 6, 1936 |
| 2,166,917 | McCormack | July 18, 1939 |
| 2,221,911 | Dickey | Nov. 19, 1940 |
| 2,294,228 | Derby | Aug. 25, 1942 |
| 2,326,702 | Taylor | Aug. 10, 1943 |

FOREIGN PATENTS

| Number | Country | Date |
|---|---|---|
| 195,313 | Germany | Feb. 11, 1908 |